April 21, 1964        R. E. BURRIS        3,129,518
METHOD OF AND APPARATUS FOR TEACHING MATHEMATICS
Filed Sept. 21, 1961        5 Sheets-Sheet 1
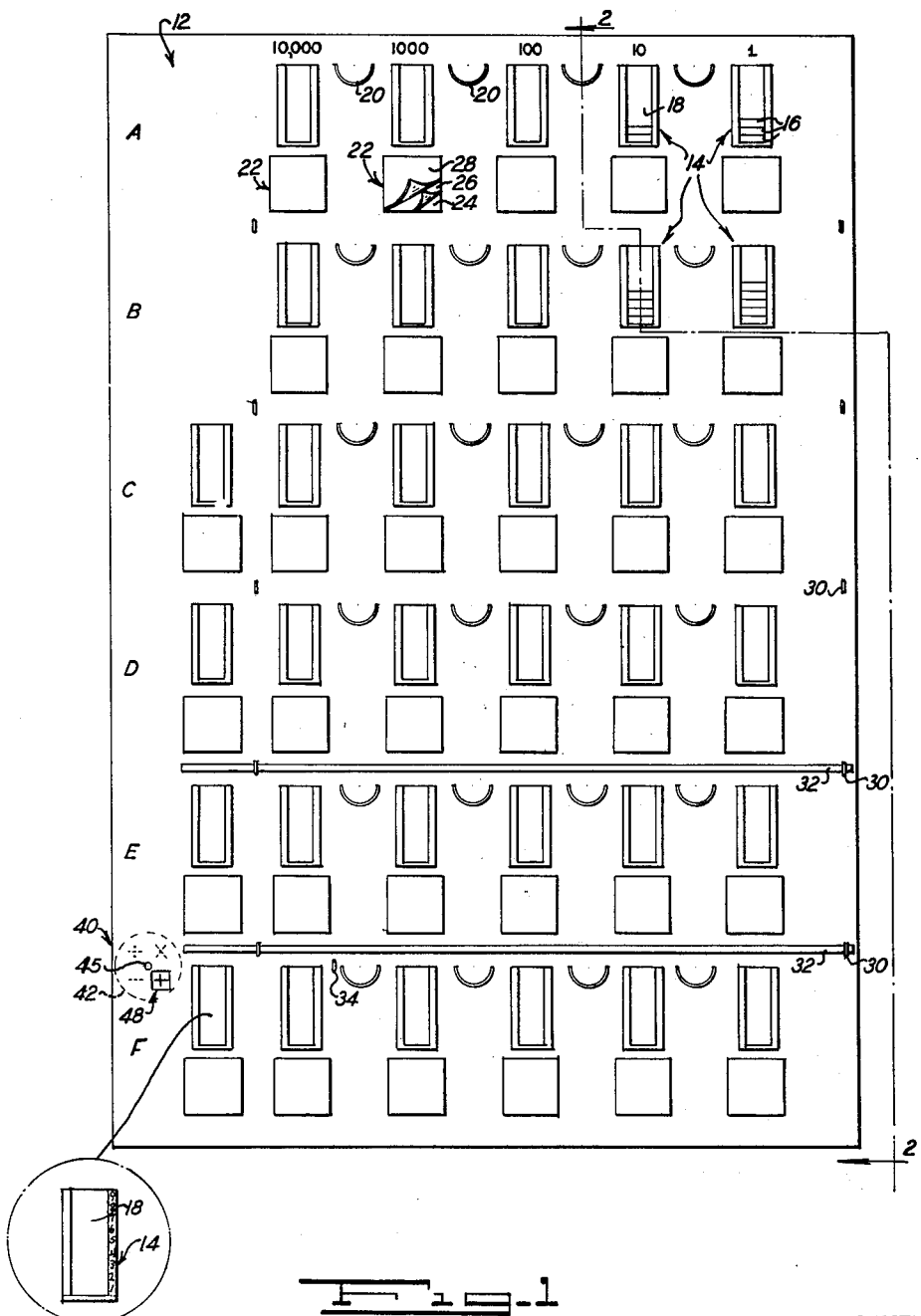
INVENTOR
ROBERT E. BURRIS
BY Jacobi & Davidson
ATTORNEYS April 21, 1964 R. E. BURRIS 3,129,518
METHOD OF AND APPARATUS FOR TEACHING MATHEMATICS
Filed Sept. 21, 1961 5 Sheets-Sheet 2
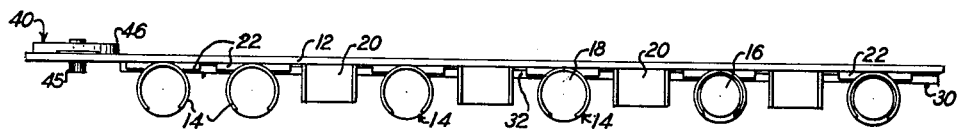
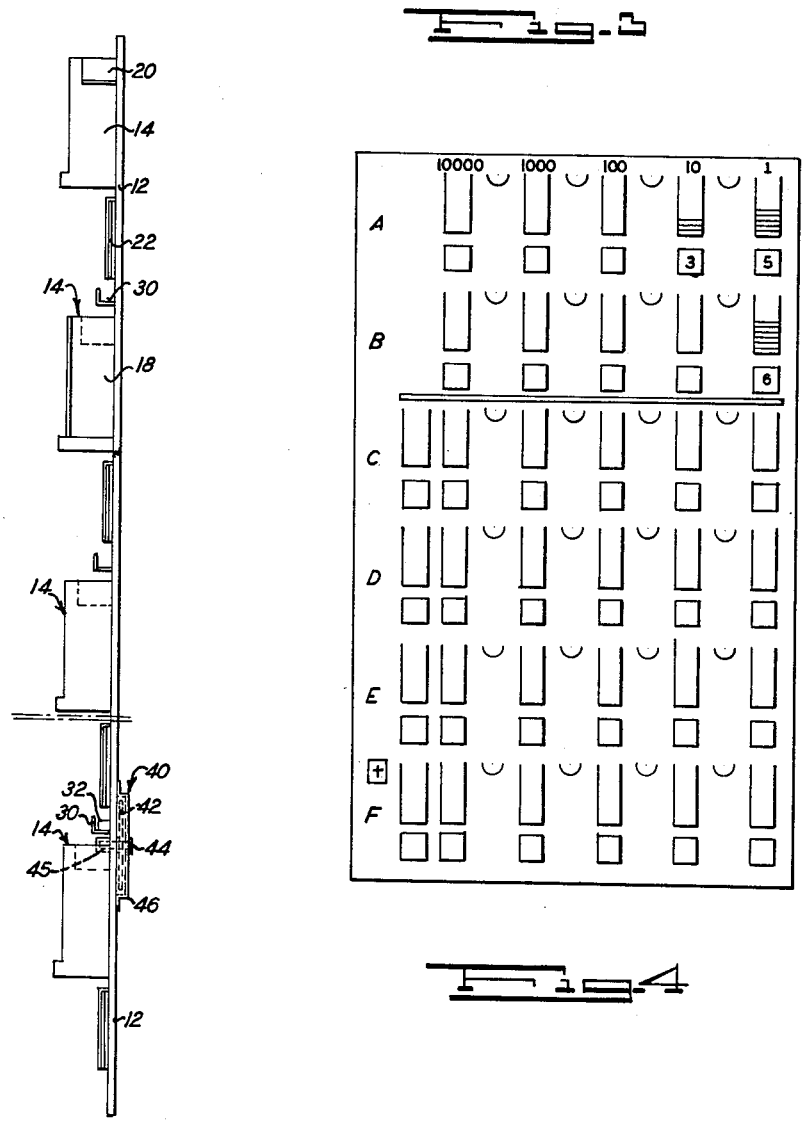
INVENTOR
ROBERT E. BURRIS
BY Jacobi & Davidson
ATTORNEYS April 21, 1964 R. E. BURRIS 3,129,518
METHOD OF AND APPARATUS FOR TEACHING MATHEMATICS
Filed Sept. 21, 1961 5 Sheets-Sheet 3

INVENTOR
ROBERT E. BURRIS
BY Jacobi & Davidson
ATTORNEYS

April 21, 1964 R. E. BURRIS 3,129,518
METHOD OF AND APPARATUS FOR TEACHING MATHEMATICS
Filed Sept. 21, 1961 5 Sheets-Sheet 4

INVENTOR
ROBERT E. BURRIS
BY Jacobi & Davidson
ATTORNEYS

April 21, 1964    R. E. BURRIS    3,129,518
METHOD OF AND APPARATUS FOR TEACHING MATHEMATICS
Filed Sept. 21, 1961    5 Sheets-Sheet 5

INVENTOR
ROBERT E. BURRIS
BY Jacobi & Davidson
ATTORNEYS

United States Patent Office 3,129,518
Patented Apr. 21, 1964

3,129,518
METHOD OF AND APPARATUS FOR
TEACHING MATHEMATICS
Robert E. Burris, 14121 London Lane, Rockville, Md.
Filed Sept. 21, 1961, Ser. No. 139,643
9 Claims. (Cl. 35—31)

This invention relates generally to the art of mathematics instruction, and is particularly concerned with improvements in methods of, and apparatus for, clearly conveying mathematical concepts to a student or students.

Various methods for teaching mathematics have heretofore been proposed, and a multiplicity of different structural assemblies adapted to serve as teaching aids have previously been suggested. Notwithstanding the prior suggestions of which I am aware, however, there remains a need for a simple device adapted to readily convey to a student mathematical concepts, the principles involved in basic mathematical operations, and particularly the underlying basis of place value.

Accordingly, the present invention has as one of its primary objects the provision of improved and simplified methods for teaching the basic concepts of and principles of operation involved in, mathematics. Still further, the invention has as one of its primary objects the provision of an improved and simplified mathematics teaching aid with which the methods of the invention can be readily and easily performed.

Still an additional, yet somewhat more specific primary object of the present invention is to provide a visual mathematics teaching aid which is readily adapted to present the concept of place value, the concept of grouping and re-grouping, and the operations involved in addition, subtraction, multiplication, and division.

Yet other, still further and more specific objects of the instant invention are: (a) the provision of a mathematics visual teaching aid conforming with the preceding objects and comprising a base member or support having a plurality of receptacles disposed thereon, and a plurality of substantially equally dimensioned pieces adapted to be received in the receptacles; (b) to provide such a teaching aid wherein the receptacles are disposed in horizontal rows so as to represent respectively the units place, the tens place, hundreds place, thousands place, etc.; (c) to provide such a teaching aid wherein the receptacles are adapted to receive a maximum of nine pieces in stacked relation, and wherein the receptacles in a given horizontal row are vertically aligned with receptacles in other horizontal rows so as to provide a series of vertical and horizontal rows whereby the horizontal rows of receptacles can be filled with pieces so as to represent a given number and whereby the vertical rows, for example, are representative of "addition columns"; (d) to provide such a teaching aid incorporating a plurality of bar-type members adapted to be removably supported in various positions on the base member so as to define, for example, "addition lines," "subtraction lines," and/or lines defining a division problem, or separating the multiplier and multiplicand from the space wherein multiplication operations are carried out; (e) to provide such a teaching aid wherein the components can be easily and inexpensively manufactured so as to allow the fabrication and sale of the teaching aid at a comparatively low price; and (f) to provide such a teaching aid which can comprise any number of receptacles and pieces desired depending on the complexity of the operations which one desires to carry out or illustrate with the device.

The method aspects of the invention provide for supporting a number of groups of pieces in spaced apart relation in a horizontal row so as to represent given numbers to be added, subtracted, multiplied, or divided, and then adjusting the number of pieces from row to row in a predetermined order depending upon the particular operation to be carried out. The apparatus of the invention, in its basic aspects, comprises a base member, a plurality of receptacles carried in side by side relation on the base member, and a plurality of at least substantially equally dimensioned stackable pieces. The receptacles preferably have a longitudinally disposed elongate opening therein, and carry graduations adjacent the opening. The receptacles are dimensioned to receive a maximum of nine pieces in stacked relation, and the graduations on the receptacles correspond to the number of pieces carried therein. Preferably, a substantial number of receptacles is provided on the base member, and the receptacles are arranged in horizontal and vertical rows. Moreover, the invention contemplates the provision of (a) means for indicating the operation to be performed, (b) bars adapted to be attached to the base member to designate normal "mathematical lines," and (c) means for recording the number of pieces within a given receptacle at a given time. Additionally, the teaching aid preferably incorporates means to retain at least one of the pieces between adjacent receptacles in a row.

The invention will be better understood, and objects other than those specifically set forth above, will become apparent when consideration is given to the following detailed description. Such discription refers to the annexed drawings presenting preferred and illustrative embodiments of the invention, as well as schematic representations of the manner in which the methods of the invention are carried out with the apparatus provided hereby.

In the drawings:

FIGURE 1 is a front elevational view of a teaching aid constructed in accordance with the present invention;

FIGURE 2 is a sectional view of the teaching aid taken on the line 2—2 of FIGURE 1;

FIGURE 3 is a top end view of the teaching aid shown in FIGURES 1 and 2;

FIGURE 4 is a schematic representation of the aid shown in FIGURE 1, FIGURE 4 presenting such aid as the same would appear when set up for an addition operation;

Figure 10:
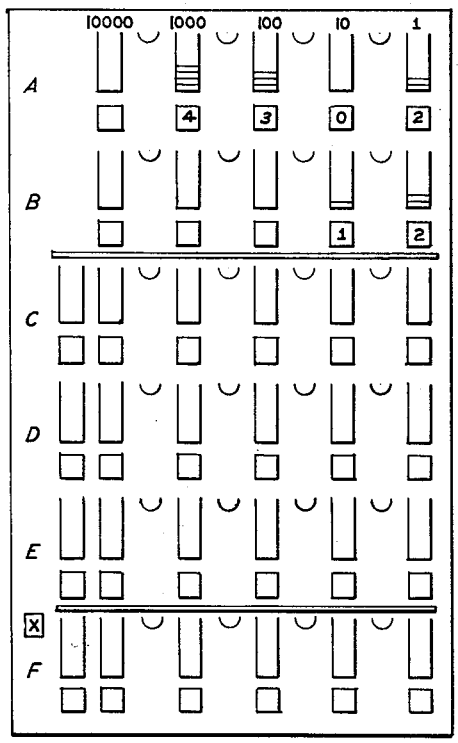
FIGURE 10 is a schematic representation of the aid shown in FIGURE 1, FIGURE 10 presenting the same as set up for a multiplication operation.
Figure 11:
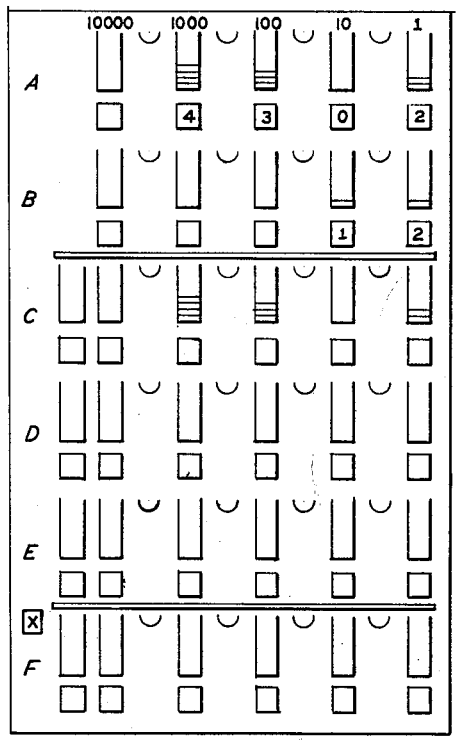
Figure 12:
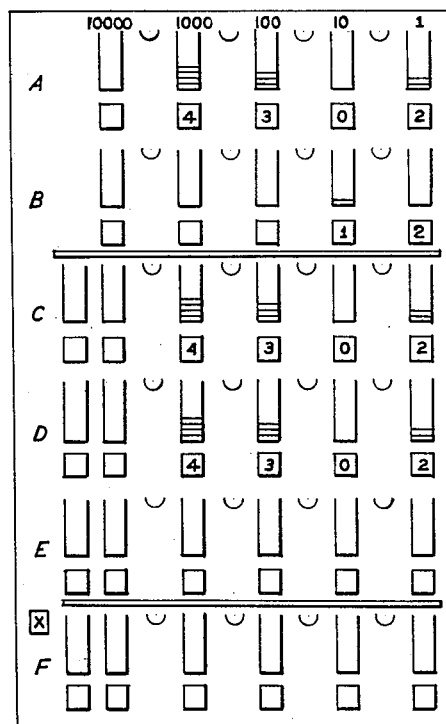
Figure 13:
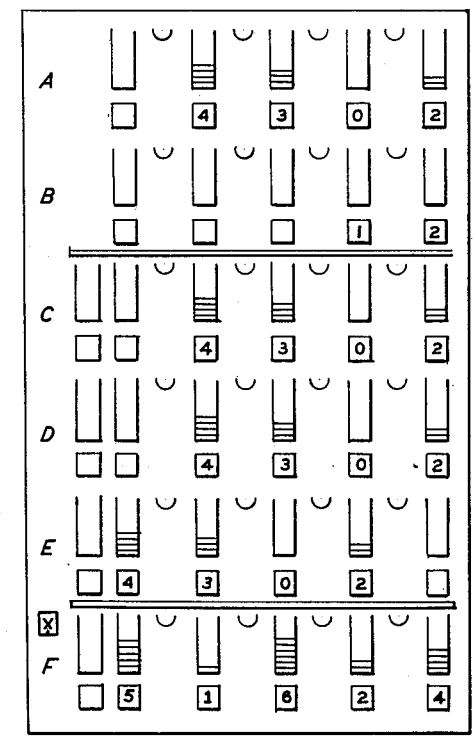
Figure 14:
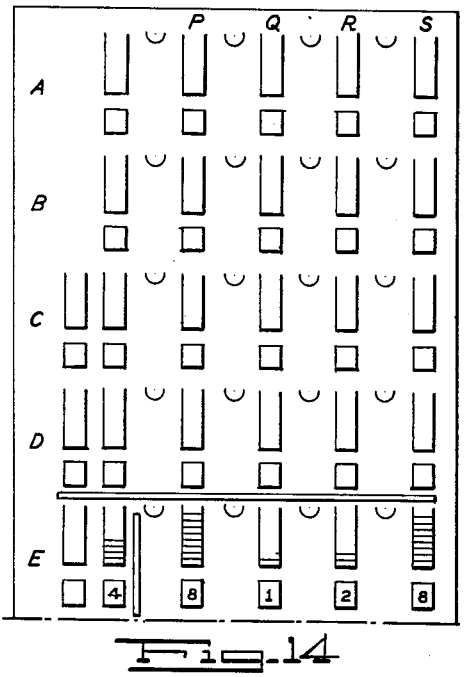
Figure 15:
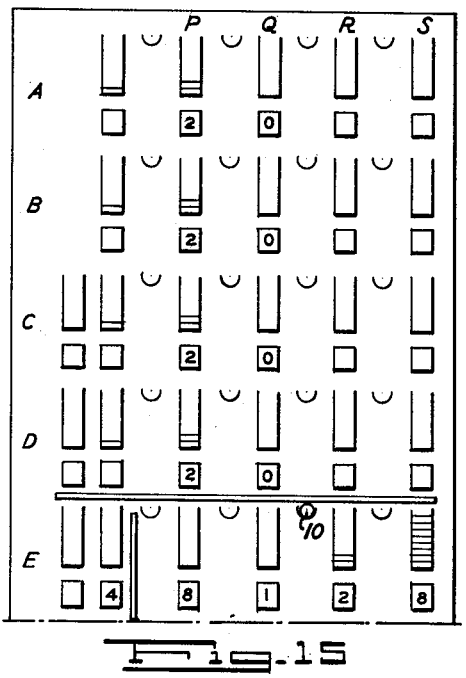
Figure 16:
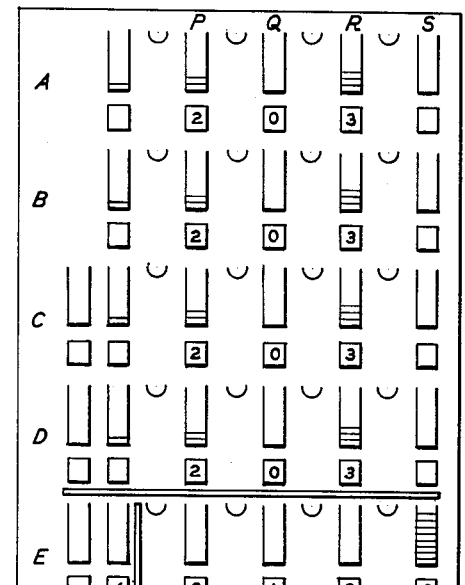
Figure 17:
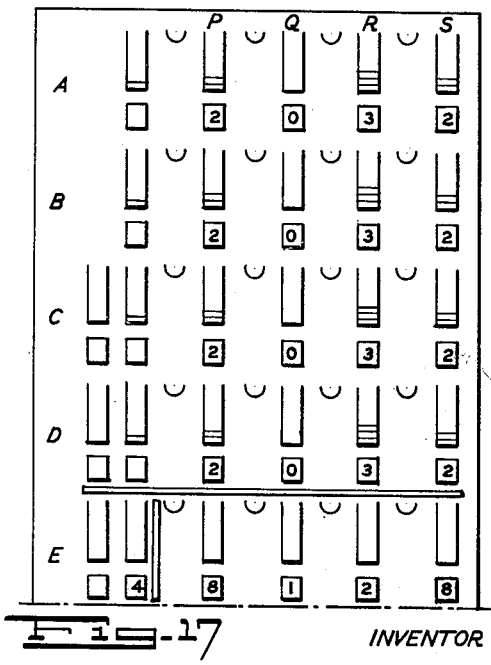

FIGURE 11, FIGURE 12, and FIGURE 13 are schematic representations similar to FIGURE 10 but presenting the aid as it would appear during successive stages of a multiplication operation;

FIGURE 14 presents schematically the aid shown in FIGURE 1 as it would appear during an initial division operation; and FIGURE 15, FIGURE 16, and FIGURE 17 are schematic representations similar to FIGURE 14 but presenting schematically the aid as the same would appear during successive stages of a division operation.

By referring to FIGURE 1, it will be noted that the aid shown therein comprises a base member generally designated by the numeral 12, a plurality of receptacles generally designated by the number 14, and a plurality of piece generally designated by the numeral 16 and carried within certain receptacles. Each of the receptacles 14 is provided with a longitudinally disposed elongate opening 18, preferably in the forward face thereof, and carries adjacent such opening a plurality of graduations 1 through 9. (See magnification, lower left, FIGURE 1.)

Each of the pieces 16 preferably is of a disc shape, and the pieces are suitably dimensioned to be received within the receptacles 14, or conversely the receptacles 14 are suitably dimensioned to receive the pieces 16. The pieces, as shown, are checker-like, and of at least substantially equal dimension whereby they can be received in stacked relation within the receptacles. It is important to note that each of the receptacles has a base whereby the pieces 16 are supported therein when vertically stacked upon one another.

The receptacles 14 are preferably disposed and supported on the base member in horizontally and vertically aligned spaced relation to provide a plurality of vertical and horizontal rows of receptacles. By again referring to FIGURE 1, it will be noted that a series of receptacles is carried in vertically spaced apart relation under the heading "1's" appearing at the top of the base member 12. Similarly, a vertical column of spaced receptacles is carried under the heading "10's," under the heading "100's," under the heading "1000's," under the heading "10,000's," etc. Moreover, as suggested, the receptacles are disposed in a plurality of horizontal rows generally designated as A, B, C, D, and E.

In addition to the receptacles, the base member 12 also has provided thereon a plurality of retaining means 20, which as shown comprise semi-cylindrical shelves disposed between respective horizontally spaced apart receptacles. Additionally, the base member preferably also carried a plurality of recording means generally designated by the numeral 22. These recording means take the form of a "magic slate" according to the preferred embodiment of the invention. More specifically, each of the recording means comprises a base member 24, an intermediate sheet 26, and a transparent cover sheet 28. The sheets are disposed and arranged in a conventional manner, whereby when pressure is applied on the sheets 28, the same is transmitted to the sheet 26 and the base member 24 whereby a given letter or numeral, for example, appears through the face sheet 28. As is also conventional, when the sheets 26 and 28 are lifted clear of the base member 24 of each of the recording means, any indication previously recorded thereon is automatically and easily removed. While the "magic slate" type of recording means is shown in the drawings, it will be understood that any other suitable recording means might be used such as, for example, scratch pads, slates, or the like.

In order to provide mathematical operation "lines" the base member carries a series of hook members 30 which consist of right angle arms projecting forwardly of the front face of the base member 12 as shown in FIGURE 2. Pairs of hooks 30 are spaced apart and horizontally aligned so as to receive and support the mathematical lines 32 which comprise elongated bars. As explained in more detail below, a similar hook such as that designated by numeral 34 is preferably incorporated so as to permit incorporation of, and support for, a short division line bar.

The preferred embodiment of the invention contemplates providing means for selectively indicating the mathematical operation to be performed. This means is generally designated by the numeral 40 in FIGURE 1 and the preferred construction thereof is presented in detail in FIGURE 2. Such means includes an indicating member generally designated by the numeral 42 which, as shown, comprises a rotatable disc. The disc is mounted for rotation on shaft 44 projecting forwardly of and through the housing 46. The shaft carries knob 45 on the end thereof projecting beyond base member 12, and the face of the disc is provided in different quadrants with different mathematical symbols, for example, +, −, and the like. The window 48 is provided in the forward face of the base member 12 of the aid so as to selectively expose the symbols carried on the disc 42. In this manner, by rotating the disc, an indication of the particular operation can be readily obtained. While only one means for selectively indicating the operation to be performed is shown, it will be understood that a plurality of such indicating means may be provided if desired, and that the indicating means can take various forms without departing from the scope and spirit of the invention.

Although the form of the receptacle may also be modified without departing from the scope and spirit of the invention, the preferred embodiment incorporates cylindrical receptacles having the openings 18, as shown, extending along the forward face thereof from the open top end of the receptacle so as to expose any pieces disposed therein. The base member 12 can be made from any suitable material and the receptacles and other components can be attached thereto in any conventional manner as, for example, glue, screws, or the like.

In order to understand the methods provided hereby, and the use of the apparatus provided hereby, attention will now be directed to exemplary problems. Consider again FIGURE 1, and assume that it is desired to convey to a student the exact meaning of a number, such as for example, the number "23." To convey the meaning of this number "23," one would select from a group of pieces, 23 pieces. The number 23, as is well-known, identifies generally 23 units which are, in this instance, represented by pieces.

After selection of the 23 pieces, the instructor or student, as the case may be, would proceed to fill the rightmost receptacle in any given horizontal row. For purposes of illustration, assume that the receptacle to the furthest right in row A is initially filled. Nine pieces could be disposed in this receptacle, before it "overflowed." It would thus be clear to the student that the unit receptacle can only hold nine pieces without overflowing. It would also be clear that if more than nine pieces are existent and representative of a particular number, then in addition to using the "units" column, one must also use the "tens" column. Thus, the concept of a number consisting of tens and units would be conveyed to the student.

Having conveyed this concept, one would proceed to see how many piles of tens can be made from the twenty-three existing pieces. Obviously, two piles can be made with three pieces left over. Thus, the student would place two pieces in the tens column representing the number of tens in the particular number "23," and three pieces in the units column. Row A of the aid would then appear as shown in FIGURE 1, and the idea of place value would be established. Of course, in the event a number such as 1001 were chosen, then the same process would be used, but it would be expanded to each of the respective places.

Now, if it were desired to carry out an addition operation, then a number of pieces representative of the numbers to be added would be placed in respective horizontal rows. Consider FIGURE 4, and assume for example, that one desires to add the numbers 35 and 6. In the units column of row A, there would be placed five pieces and the tens column of row A, there would be placed three pieces, so that row A designates the number 35. Similarly, in the units column of row B six pieces would be placed. The aid would then be set up for performing the addition operation. The next step would be to take all the pieces in the units column of row A and all the pieces in the units column of row B and place the same in the units column of row C. This obviously means that one is taking all of the units and adding them together. When this operation was performed, it would be seen that there were eleven pieces to be placed, in the units column, and that this is impossible. Having previously encountered a similar situation, as for example, in connection with conveying the meaning of the number "23," it would be apparent that since eleven pieces will not fit within the units column of row C, use must be made of the tens column thereof. Thus, one piece would be placed in the tens column representative of a group of ten units, and one piece would be placed in the units column representing the one unit piece "left-over."

Figure 5:
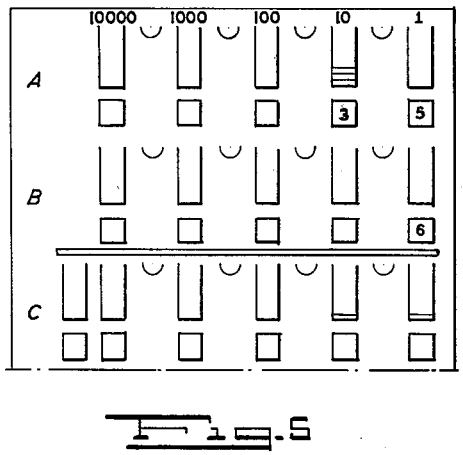
FIGURE 5 and FIGURE 6 are schematic representations similar to FIGURE 4 presenting the aid as the same would appear during respective successive stages of an addition operation.
Figure 6:
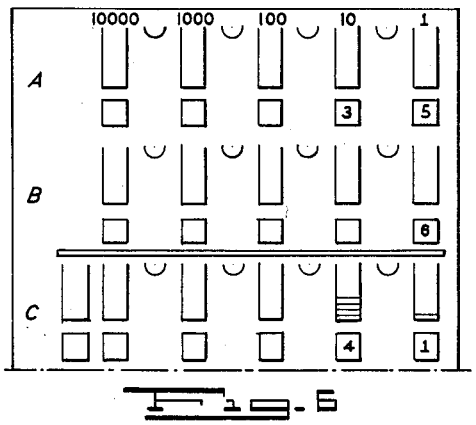

Thereafter, the pieces in the tens column of row A and the pieces in the tens column of row B would be taken together and used to fill the tens column of row C. In this example, there are no tens pieces in row B, and thus the three tens pieces in row A would be placed within the tens receptacle of row C together with the previous one piece having been placed therein when the units column addition was performed. FIGURE 5 presents the teaching aid as it would appear during the transition stage, and FIGURE 6 presents such aid as it would appear presenting the answer.

Figure 7:
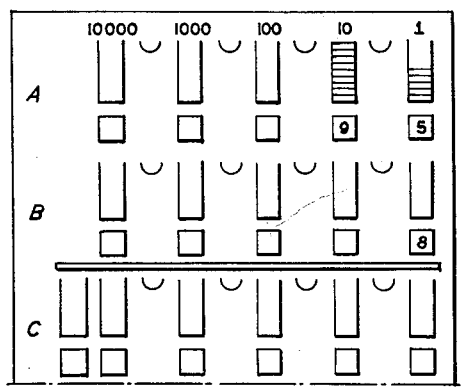
FIGURE 7 is a schematic representation of the aid shown in FIGURE 1, but FIGURE 7 presents the same as it would appear when set up for a subtraction operation.
Figure 8:
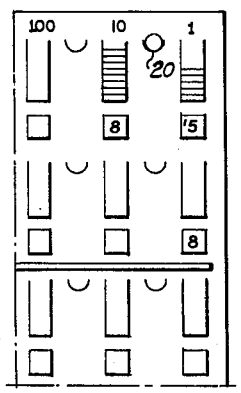
FIGURE 8 and FIGURE 9 are schematic representations similar to FIGURE 7, but presenting the aid as it would appear during successive stages of a subtraction operation.
Figure 9:
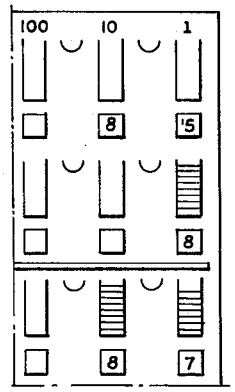

FIGURES 7, 8, and 9 illustrate the operations which would be performed in the event one wished to teach the principles of subtraction. Assume, for this example, that one wishes to subtract 8 from 95. In this instance, the larger number would be placed in row A, i.e. nine pieces would be placed in the tens receptacle of row A, and five pieces would be placed in the units receptacle of row A. (The apparatus would then appear as shown in FIGURE 7.)

For subtraction, the concept involved is that of taking a certain number of pieces away from another group of pieces. Thus, one would attempt to obtain eight pieces from the units receptacle of row A, but all of the pieces cannot be obtained from the units column of row A, because only five pieces exist therein in this example. However, nine "ten" pieces are represented by the nine pieces in the tens column of row A. Thus, a group of ten pieces can be "borrowed" from the tens column of row A and used with the pieces in the units column of row A. More specifically, if one takes one piece from the "tens" receptacle of row A and puts it into retaining means designated by numeral 20, then one can select ten pieces from a pile of pieces and combine such ten pieces with the five pieces in the units column of row A. The operator would then have fifteen unit pieces and could take eight of the same away and place these eight pieces in the units column of row B. After the eight pieces were subtracted from the fifteen obtained due to the borrowing operation, seven pieces would be left, and these seven pieces would be placed in the units column of row C. A similar operation would now be performed on the tens column. However, there are only eight tens pieces remaining in the tens column of row A, and since no pieces need be subtracted therefrom due to lack of pieces in the tens column of row B, such eight pieces would be moved to the tens column of row C. The answer of 87 would then be obtained, as shown in FIGURE 9. On the recording means 22, the various numbers are written just as in usual mathematical operations. Thus, the recording means under the units column of row A has a primary "5" written therein and a secondary "1" noted thereon to indicate the original five pieces in such column and the additional ten pieces that were "borrowed" as explained above. The other recording means are shown with the proper numbers written thereon.

The manner in which a multiplication is carried out is presented in FIGURES 10 through 13 inclusive. Here it is assumed that one wishes to multiply the number 4302 by the number 12. Row A of the device of FIGURE 10 is provided with pieces in the respective receptacles representative of the number 4302, the multiplicand, and similarly row B is provided with pieces representative of the number 12, the multiplier. The concept here to be conveyed is basically that of repeating the multiplication as many times as the multiplier indicates. This, however, is done in terms of "units" and "tens." Thus, the multiplicand is repeated a number of times equal to the "units," and then a number of times equal to the "tens" of the multiplier with the places properly arranged. If the aid has been set up, as shown in FIGURE 10, then one removes one piece from the units column of row B and places pieces representative of 4302 in the respective receptacles of row C as shown in FIGURE 11. This means essentially that 4302 has been multiplied by one. Thereafter, one removes the remaining piece in the units column of row B and places pieces representative of the number 4302 in row D. Two "units" multiplying operations have thus been performed since the number 4302 has been repeated twice in rows C and D. Thereafter, the operator takes the one piece in the tens column of row B away and places pieces representative of 4302 as shown in FIGURE 13, in row E of the receptacles. It will be noted that the units column of row E is not used, but instead the last digit of number 4302 appears in the tens column as customary in ordinary multiplication. Naturally, this is done because the operation here is that of multiplying by ten as opposed to multiplying by a unit. After the foregoing steps have been performed, then addition is carried out so that the rows C, D, and E are added together and the answer appears in row F. The addition operation corresponds with that explained hereinabove in connection with FIGURES 4-6, and accordingly is not here repeated.

In the foregoing explanation with respect to FIGURES 10-13, inclusive, the multiplication was carried out by placing each successive product in successive rows, and thereafter adding all of the rows. While this operation is satisfactory when small numbers are involved, if the multiplier is large the number of rows on the operating board must be substantial. Accordingly, at least under these circumstances, the multiplication is carried out by stacking the successive products in a single row. More specifically, for example, instead of using rows C and D of FIGURE 12, as shown, only row C would be used, and during the second multiplying operation, the pieces shown in row D of FIGURE 12 would be stacked on top of the pieces shown in row C of FIGURE 12. Thus, essentially, with larger numbers, there would be a combined multiplying and adding operation.

In a division operation, the concept is that of dividing a particular number into a series of equal parts. Consider FIGURE 14, and assume for this example that one wishes to divide the number 8128 by the number 4. Here, the number 8128 is placed in row E to the right of the column designated as E. This number is to be split into four parts and thus one piece is placed in rows A, B, C, and D, respectively of the column designated as T. In this manner, the fact that the number 8128 must be split into four separate equal groups becomes manifest.

After the board was set-up as shown in FIGURE 14, then the first operation would be to divide the eight pieces in column P, row E into four equal units. This is done by placing an equal number of pieces in each P receptacle in rows A, B, C, and D. Subsequent to this operation, as shown in FIGURE 15, one would attempt to split the one piece appearing in row E, column Q into four equal units. This cannot be done, and accordingly, the one piece is placed in the retaining means 10 disposed between columns Q and R in row E. This one piece is representative of ten pieces, and thus when the next operation FIGURE 16 is carried out, one splits these ten pieces plus the two pieces in the receptacle of column R, row E into four equal groups which results in placing three pieces in the R receptacles of rows A, B, C, and D. The final operation FIGURE 17 is carried out by splitting the pieces in the S column of row E to four equal groups and this means that two pieces would be disposed in the S receptacles of rows A, B, C, and D. Any given row A, B, C, or D then contains the answer. Should some pieces be left over, i.e., should the last number not be capable of being split evenly between the respective rows A, B, C, and D, then such pieces are returned to the S receptacle of row E, and they represent the remainder.

In each of the examples explained above numbers are preferably written on the recording means in the manner shown in the respective figures. By virtue of this recording, the operation that was performed remains apparent regardless of the movement of the pieces. This is an important aspect of the invention.

While only simple problems have been used for illustrative purposes above, it should be apparent that the device and methods are adapted to handle more complicated operations. For example, removable decimal points can be provided and more rows and columns can be included. Moreover, it should also be apparent after reading the foregoing description that the objects set forth at the outset of this specification have been successfully achieved, and that modifications other than those specifically set forth can be incorporated without departing from the scope and spirit of the invention.

Accordingly,

What is claimed is:

1. A mathematics visual teaching aid comprising a base member, a plurality of receptacles carried on said base member, and a plurality of equally dimensioned stackable pieces, each of said receptacles being disposed on said base member in horizontally and vertically aligned spaced relation to other of said receptacles to provide a plurality of horizontal and vertical rows of receptacles, each of said receptacles having a longitudinally disposed elongate opening therein, each of said receptacles being dimensioned to receive a maximum of nine pieces in stacked relation, and a plurality of retaining means for supporting at least one of said pieces, each of said retaining means being disposed adjacent a different two of said receptacles disposed in side-by-side relation to serve as memory devices for retaining a piece indicative of a number to be carried-over during a mathematical operation.

2. A mathematics visual teaching aid comprising a base member, a plurality of receptacles carried on said base member, and a plurality of equally dimensioned stackable pieces, each of said receptacles being disposed on said base member in horizontally and vertically aligned spaced relation to other of said receptacles to provide a plurality of horizontal and vertical rows of receptacles, each of said receptacles having a longitudinally disposed elongate opening therein, each of said receptacles being dimensioned to receive a maximum of nine pieces in stacked relation, and a plurality of carry indicator means for supporting at least one of said pieces, each of said carry indicator means being disposed adjacent a different two of said receptacles disposed in side-by-side relation.

3. A mathematics visual teaching aid as defined in claim 2 and further including a plurality of means for recording, each of said means for recording being disposed adjacent one of said receptacles whereby the number of pieces disposed therein can be recorded.

4. A mathematics visual teaching aid as defined in claim 3 wherein each of said means for recording comprises a readily erasable recording area.

5. A mathematics visual teaching aid as defined in claim 2 and further including means for selectively indicating the mathematical operation to be performed.

6. A mathematics visual teaching aid as defined in claim 5 wherein said means for selectively indicating comprises an indicating member movably supported behind the forward face of said base member and carrying spaced apart indicia thereon representative of different mathematical operations, and wherein said forward face is provided with a window adapted to expose any given one of said indicia.

7. A mathematics teaching aid as defined in claim 2 wherein said receptacles carry graduation symbols adjacent said openings to indicate the number of pieces disposed therein.

8. A mathematics teaching aid as defined in claim 2 and further including mathematical line bars, and means for removably supporting said bars on said base member.

9. A mathematics visual teaching aid comprising a support member, a plurality of tubular receptacles having a closed end and an opposed open end, a plurality of disc shaped stackable pieces, receptacles being affixed to said support member in aligned spaced relation to one another and providing a plurality of horizontal and vertical rows of receptacles, each of said receptacles being dimensioned to receive a maximum of nine pieces in stacked relation, each of said receptacles having a longitudinally disposed slot extending from said open end along the forward face thereof toward said closed end and exposing any pieces disposed therein, each of said receptacles carrying graduations adjacent said slot, said graduations being spaced to indicate the number of pieces within the receptacle, and a plurality of piece retainers disposed between adjacent horizontal receptacles in at least one horizontal row thereof.

References Cited in the file of this patent

UNITED STATES PATENTS

| 909,823 | Roscoe | Jan. 12, 1909 |
| 1,532,011 | Williamson | Mar. 31, 1925 |
| 1,703,994 | Earl | Mar. 5, 1929 |
| 1,900,798 | Chappell | Mar. 7, 1933 |

FOREIGN PATENTS

| 313,826 | Great Britain | June 20, 1929 |